(No Model.) 4 Sheets—Sheet 3.

J. F. STEWARD.
CORN HARVESTER.

No. 484,561. Patented Oct. 18, 1892.

ON LINE 3-3.

Witnesses:

Inventor:
J. F. Steward
By his Atty
Phil T. Dodge (No Model.)  
4 Sheets—Sheet 4.

J. F. STEWARD.
CORN HARVESTER.

No. 484,561. Patented Oct. 18, 1892.

on line 4-4

UNITED STATES PATENT OFFICE.

JOHN F. STEWARD, OF CHICAGO, ILLINOIS.

CORN-HARVESTER.

SPECIFICATION forming part of Letters Patent No. 484,561, dated October 18, 1892.

Application filed May 19, 1888. Serial No. 274,416. (No model.)

*To all whom it may concern:*

Be it known that I, JOHN F. STEWARD, of Chicago, in the county of Cook and State of Illinois, have invented certain new and useful Improvements in Corn Harvesting and Husking Machines, of which the following is a full description.

My invention relates to an improvement on that class of corn harvesting and husking machines represented in an application for Letters Patent of the United States filed by me on the 19th day of May 1888, Serial No. 274,414, in which an elevating mechanism supported upon ground-wheels is provided at its lower end with a gathering and cutting mechanism and at its upper end with a husking mechanism, the machine being preceded by a receptacle attached thereto to receive the corn. In the machine above referred to the stalks are severed and deflected sidewise with relation to the line of advance of the machine and fall into a receptacle located adjacent to the elevating mechanism and are delivered by said elevating mechanism into the receptacle provided for them. The machine in the present application as it advances severs the stalks, which fall rearwardly directly into a receptacle located adjacent to the elevating mechanism, are elevated thereby, and delivered to a receptacle at the side of the machine.

Figure 1:
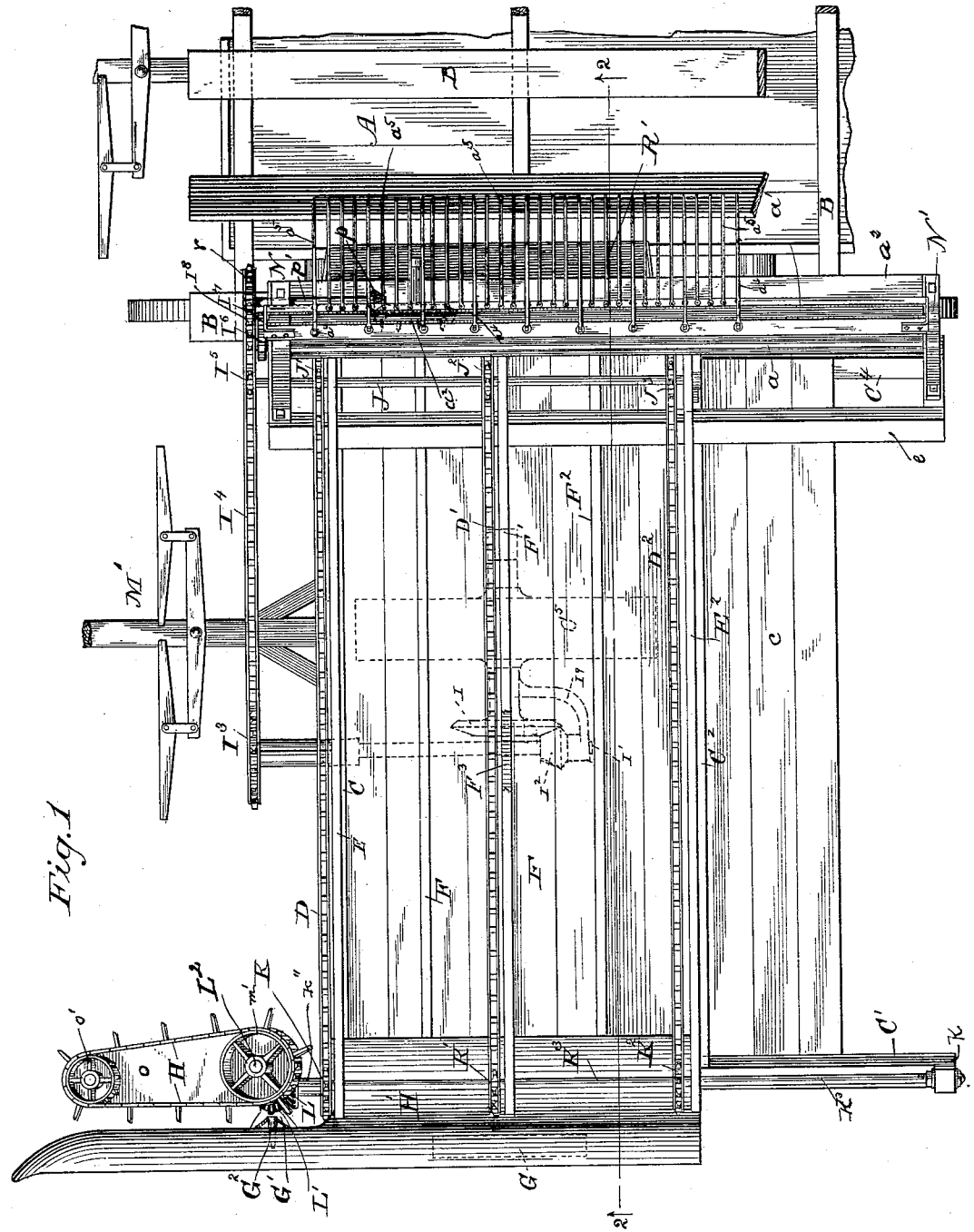
Figure 2:
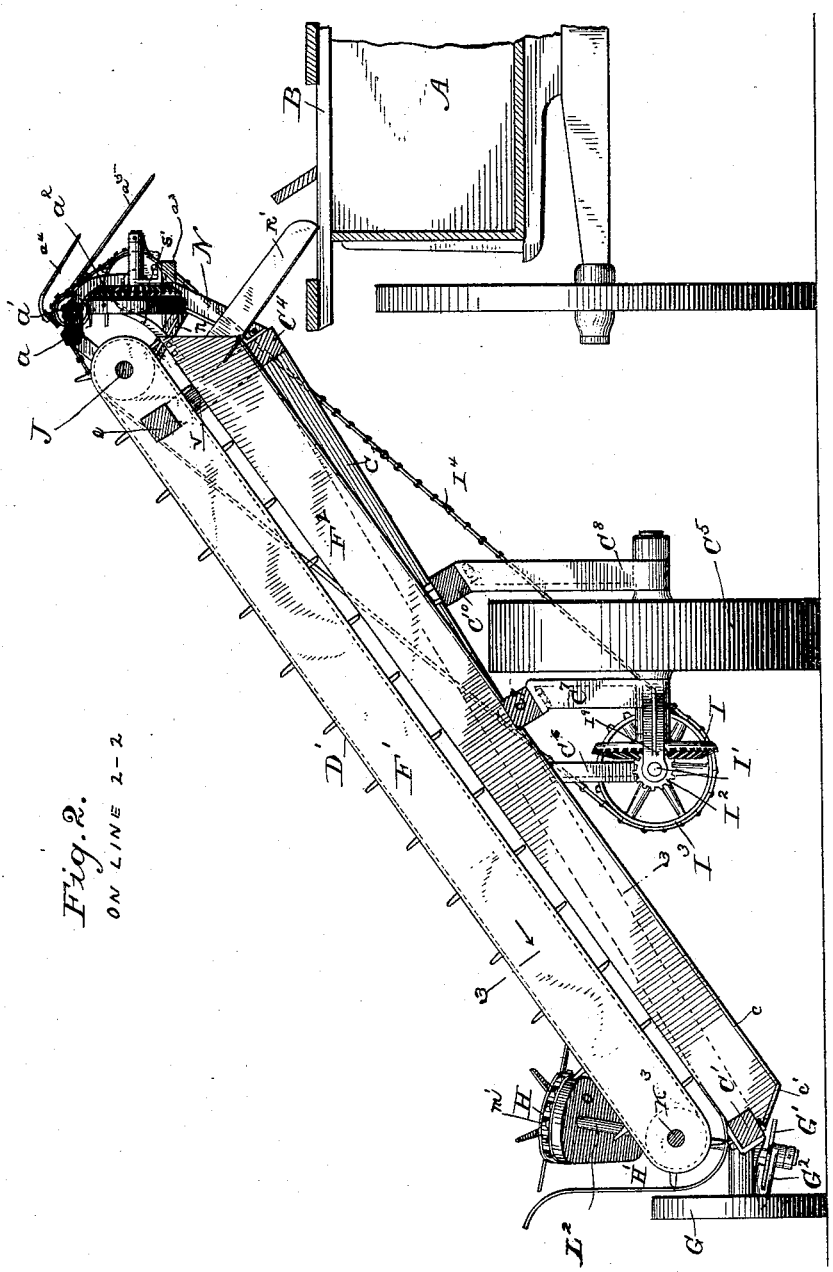
Figure 3:
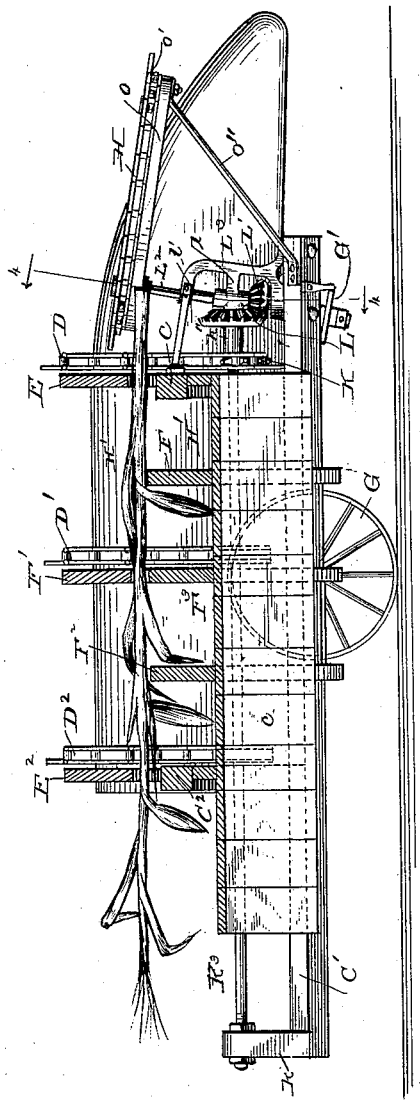
Figure 4:
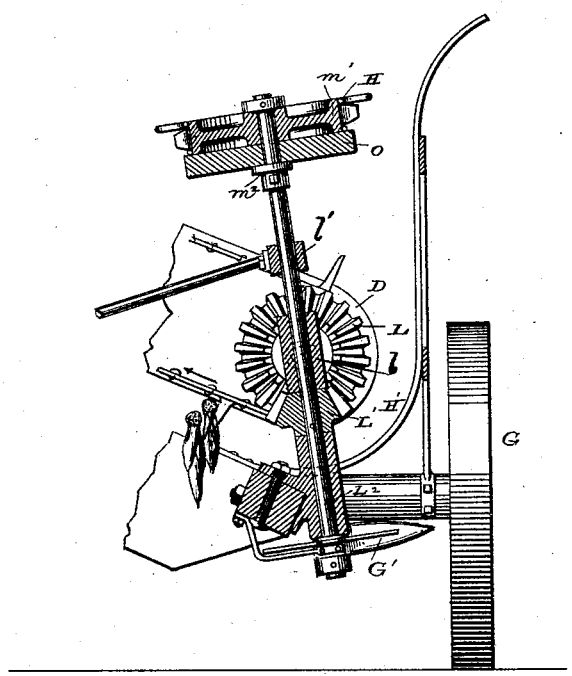

In the accompanying drawings, Figure 1 is a top plan view of the machine. Fig. 2 is a longitudinal vertical section of the same on the line 2 2 of Fig. 1. Fig. 3 is a sectional elevation on the line 3 3 of Fig. 2, looking in the direction of the arrow. Fig. 4 is a vertical cross-section, on the line 4 4 of Fig. 3, on an enlarged scale.

Referring to the drawings, a rectangular frame consisting of the side bars $C$ $C^2$ and the ends bars $C^4$ $C'$ is sustained near its center by a main wheel $C^5$ and its lower end by a ground-wheel $G$. This frame is provided with a flooring consisting of the boards $c$, attached at their upper ends to the top of the end bar $C^4$, and at their lower ends they are secured to an underlying rail $c'$, which is attached to the end bar $C'$. The main wheel is journaled in hangers $C^7$ and $C^8$, attached to transverse beams $C^9$ and $C^{10}$, bolted or otherwise firmly secured to the under side of the frame.

$F$, $F^3$, and $F^2$ represent a series of boards or guides standing on their edges at intervals upon the flooring $c$ and extending lengthwise of the machine. These boards serve as guides upon which the stalks lying transversely thereon are conveyed by elevating-chains, hereinafter described, the ears on the stalks depending between the guides.

$E$, $F'$, and $E^2$ represent a second series of guide-boards arranged on edge a short distance above the guides $F$, $F^3$, and $F^2$, parallel therewith. They are sustained at their upper ends by a transverse bar $e$, which passes through them and overlying the bar $C^4$. At their lower ends the guide-boards $E$, $F'$, and $E^2$ are mounted upon a shaft $K^3$, overlying the bar $C'$, and supported at its rear end thereon by the upright portion $k$.

$D$, $D'$, and $D^2$ are endless toothed conveying-chains, which pass around sprocket-wheels $K$, $K'$, and $K^2$, mounted loosely on the shaft $K^3$ at the lower end of the machine, and around sprocket-wheels $J'$, $J^2$, and $J^3$, keyed to a shaft $J$, extending transversely through the boards at the upper end of the machine. These chains are so arranged that as they travel the teeth thereon will extend below the lower edges of the guides $E$, $F'$, and $E^2$ and operate to convey the cut stalks lying between the two series of guides. The end bars $C^4$ and $C'$ and the overlying bar $e$ and the shaft upon which the elevating mechanism is supported are extended some distance in rear of the said elevating mechanism, so that stalks of unusual length may pass upward without being interfered with.

$H'$ represents a receptacle of sheet metal or other suitable material for receiving the cut stalks preparatory to being elevated. It is attached at the lower end of the machine to the upper edges of the guides $F$, $F^3$, and $F^2$, and extends therefrom in a curved direction outward and then upward, terminating at its upper edge some distance above the ground-wheel $G$. This receptacle extends from the rear elevating-chain $D^2$ forward, its bottom terminating at the forward elevating-chain $D$ and its side continuing forward somewhat in advance of the said chain, the purpose of which will hereinafter appear. It is so formed that as the cut stalks fall therein they will lie adjacent to and in reach of the teeth of the elevating-chains.

The cutter G', which in its fundamental features is substantially identical with that represented in my application above referred to, is located adjacent to the receptacle H', a slight distance in advance of the forward elevating-chain D. It is mounted on the lower end of an upright shaft $L^2$, which revolves in bearings in overhanging arms $l\ l'$, formed on a bracket $L^3$, bolted to the lower transverse bar C'. The shaft $L^2$ terminates at its upper end at a point substantially on a level with the upper edge of the receptacle H', where it is provided with a sprocket-wheel $m'$, keyed thereto. It is also provided below the arm $l$ with a bevel-pinion L'.

O represents a board or support sustained beneath the sprocket-wheel $m'$ upon a collar $m^2$, fixed to the shaft $L^2$. This board extends forward and slightly downward substantially parallel with the inner edge of the extended portion of the receptacle, and is supported at its outer end by a brace $o''$, attached thereto and to the machine. It is provided on its upper face near its end with a journal, on which is loosely mounted a sprocket-wheel $o'$, around which and the sprocket-wheel $m'$ an endless toothed gathering-chain H passes. Thus it will be perceived that the chain travels at the side of the extended portion of the receptacle H', and as the machine advances the stalks are drawn toward the machine between the said chain and receptacle and presented to the cutter.

The gathering-chain H and the cutter receive motion from a gear-wheel L, which engages the bevel-gear L'. This gear-wheel is formed on a hub $k''$, secured to the sprocket-wheel K, around which the forward elevating-chain passes and from which it receives its motion, as more fully described hereinafter.

At its upper end the machine is provided with a husking mechanism identical with that represented in my application before alluded to, and as the details of its construction form in themselves no part of the present invention they will be merely incidentally referred to and located. This husking mechanism consists of the two longitudinally-fluted picking-rollers $a\ a'$, located above and across the delivery end of the elevating mechanism. They are journaled at their ends in the castings N N', each of which extends from the bar $c$, to which they are bolted, upward and stubbleward, and then gradually downward and grainward to the upper bar $C^4$, to which they are also bolted. They are each strengthened by means of a brace $n$, as shown in Fig. 2, which is connected at its ends to the upper and lower portions of the castings. The picking-rollers are provided near their forward ends with the pinions $I^6\ I^7$, adapted to engage each other. The picking-roller $a'$ is further provided on its end with the sprocket-wheel $I^8$, through which it receives a rotary motion, as more fully described hereinafter.

$a^2$ represents an elevating-wheel located below the picking-rollers, mounted in bearings on a bar $a^3$, extending transversely of the machine. The wheel is provided on its rear face with gear-teeth adapted to engage the teeth of a bevel-pinion $p$ on the end of a shaft $p'$, which extends forward through the forward casting N, and is provided on its end with the sprocket-wheel $r$, arranged in the same plane with the sprocket-wheel $I^8$ and a sprocket-wheel $I^5$, keyed to the end of the shaft J.

$a^4$ and $a^5$ are a series of forwardly and downwardly extending bars located, respectively, above and on a level with the picking-rollers for directing the stalks after they have left said rollers beyond the end of the elevating mechanism.

R' is a shield or chute attached at the upper end of the flooring $c$, and directs the husked ears into the receptacle. The upper edge of this chute extends above the flooring to prevent ears from falling back into the machine.

$s'$ are upwardly-extending arms attached to the guides F, $F^3$, and $F^2$ for supporting the ascending stalks after they leave the said guides, and directing them between the picking-rolls.

To the under side of the machine, to the left of the main wheel, I secure the hanger $C^6$. This hanger supports one end of a horizontal shaft I', which is supported at its opposite end by an arm $I^9$, projecting from the main wheel-hanger $C^7$. This shaft is provided at its rear end with the pinion $I^2$, arranged to engage a bevel-gear I, keyed to the main wheel-shaft. At its forward end the shaft I' is provided with the sprocket-wheel $I^3$. From this last-named wheel a chain $I^4$ extends around the three wheels $r$, $I^8$, and $I^5$ for driving the elevating-wheel, the picking-rollers, and the elevating-chains, respectively. By the above arrangement of gears, motion is imparted from the main wheel-axle to the shaft I', and through the drive-chain $I^4$ to the elevating-wheel husking mechanism and elevating mechanism, and from the elevating mechanism to the gathering-chain and cutter through the pinions L L'. The gears are so formed that as the machine advances the gathering-chain will operate to draw the upper end of the stalks toward the receptacle faster than the advance of the machine, so that when they reach the cutter they will be in an inclined position, and when severed will fall by gravity directly into the receptacle.

A represents a wagon or other wheeled receptacle for receiving the cut stalks and ears, adapted to travel at the side of the cutting and husking mechanism. It is provided on its top with the slatted frame B, constructed to sustain the stalks, but permit the passage of the husked ears therethrough into the wagon, the stalks and ears as they are loaded being separated into distinct heaps. This receptacle is driven along the side of the machine beneath the upper end of the elevating mechanism, so that as the machine advances the corn cut thereby may be delivered into the wagon.

The machine is provided near its center with a draft-tongue M', as usual, by which it is drawn.

The operation is as follows: One team being attached to the cutting and husking mechanism and another to the wheeled receptacle, they are drawn side by side through the field. The stalks are first acted upon by the gathering-chain, between which and the extended portion of the receptacle they are drawn, and inclined at their tops slightly to the rear, and when severed by the cutter fall backward into the receptacle. They are then conveyed by the elevating-chains to the husking mechanism, by which the ears are torn from the stalks, the former dropping into the wagon and the latter passing between the picking-rollers and falling upon the slatted frame.

Having thus described my invention, what I claim is—

1. The wheeled frame provided with the stalk-cutting mechanism, the stalk-elevating mechanism, and the husking mechanism, and a conveying-chute thereunder at the delivery end of the elevator, in combination with the accompanying receptacle located below the delivery end of the elevator and provided with the grated receiving-surface, the said surface constructed to sustain the stalks but permit the passage of the ears into the receptacle, and the said chute leading to a passage through the grating, whereby the said stalks and ears are formed into separate heaps.

2. In a corn harvesting and husking machine, the wheeled frame and the stalk-cutter at its front, in combination with the stalk-elevator acting transversely to the line of travel, and the husking-rolls lying across the delivery end of the elevator or parallel with the line of travel, and the independent chutes or guides, acting to receive, respectively, the stalks and ears and to direct them sidewise from the machine.

3. In a mechanism for harvesting and husking corn and separating the ears and stalks, the wheeled frame, in combination with a stalk-cutter at its front, an elevator extending from a point in rear of the cutter transversely to the line of travel, husking-rolls at the delivery end of the elevator, a conveying-chute below the husking-rolls, and a wheeled receptacle beneath the delivery end of the chute, said receptacle having an upper stalk-sustaining surface and a lower ear-receiving box or chamber, the said conveying-chute leading to a passage through the stalk-sustaining surface to deliver the ears into the underlying receptacle.

JOHN F. STEWARD.

Witnesses:
ARTHUR JOHNSON,
JAMES L. BENNER.